Figure 1:
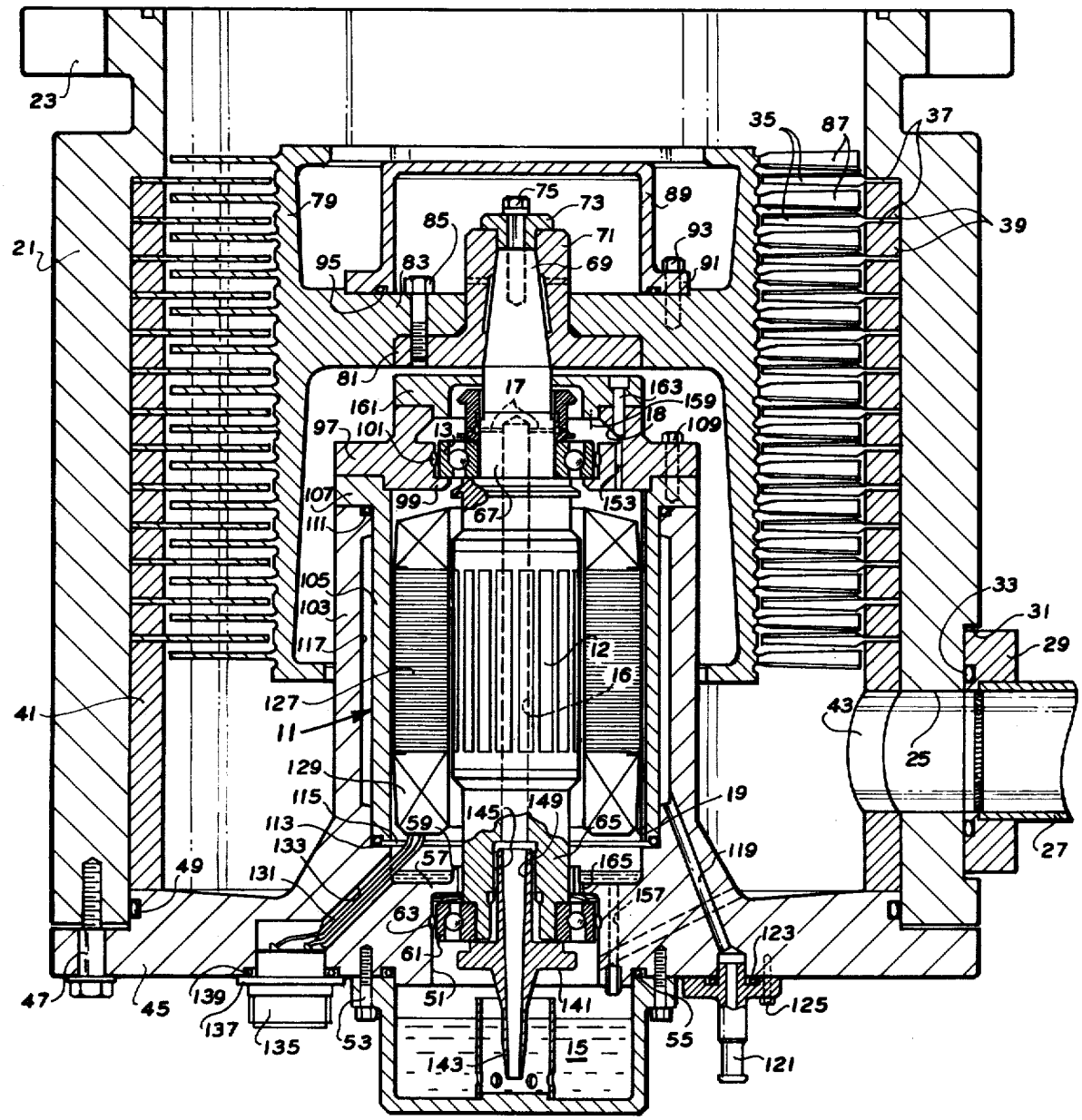

United States Patent
Shrader

[11] 3,877,546
[45] Apr. 15, 1975

[54] LUBRICATION SYSTEM FOR VERTICAL SPINDLE MOTOR

[75] Inventor: Robert L. Shrader, Castro Valley, Calif.

[73] Assignee: Airco, Inc., New York, N.Y.

[22] Filed: Apr. 12, 1973

[21] Appl. No.: 350,316

[52] U.S. Cl. .............................................. 184/6.18
[51] Int. Cl. .................................................. F16n 7/18
[58] Field of Search .............. 184/6.18; 123/196 W; 308/134.1; 417/368, 902; 418/94

[56] References Cited
UNITED STATES PATENTS

| | | | |
|---|---|---|---|
| 1,828,546 | 10/1931 | Sandstrom | 308/134.1 X |
| 2,164,294 | 6/1939 | Mahan | 184/6.18 |
| 2,246,275 | 6/1941 | Davidson | 418/94 X |
| 2,312,596 | 3/1943 | Smith | 308/134.1 X |
| 2,918,986 | 12/1959 | Leipert | 184/6.18 |
| 3,317,123 | 5/1967 | Funke | 418/94 X |
| 3,434,656 | 3/1969 | Bellmer | 418/94 |
| 3,555,962 | 1/1971 | Wolf et al. | 184/6.18 X |
| 3,767,013 | 10/1973 | Caldwell | 184/6.18 |

FOREIGN PATENTS OR APPLICATIONS

954,385  12/1956  Germany ........................ 184/6.18

*Primary Examiner*—Manuel A. Antonakas
*Attorney, Agent, or Firm*—Fitch, Even, Tabin & Luedeka

[57] ABSTRACT

A lubrication system is described for a motor having a substantially vertical spindle with a bearing toward the upper end thereof. Lubricant is carried to the bearing through an axial passage in the spindle and the design is such that most of the lubricant is by-passed from the bearing and returned to the reservoir so that a substantially greater flow of lubricant than that necessary to lubricate the bearing is provided, thereby cooling the spindle.

2 Claims, 1 Drawing Figure

LUBRICATION SYSTEM FOR VERTICAL SPINDLE MOTOR

This invention relates to lubrication systems and, more particularly, to a lubrication system for a motor having a substantially vertical spindle with a bearing toward the upper end thereof.

Lubrication systems for vertical spindle motors may take a variety of forms. One form of lubrication system which is especially suited to lubricating vertical spindle motors in a vacuum where there is a bearing toward the upper end of the spindle, involves the carrying of the lubricant up the interior of the shaft to the bearing. Since a pressurized system is not practical in vacuum, this form of lubrication system employs an axial passage in the spindle which is tapered along at least part of its length so that centrifugal forces urge lubricant upwardly through the passage. Outlets are provided from the passage at the upper end thereof to convey lubricant to the bearing. Typically, oil is supplied to the passage from an oil reservoir in which the lower end of the spindle sits.

A major problem in motors of the general type described is that, although non-rotating parts and windings can be water-cooled, the rotating parts are not easily cooled. Heat build-up in the shaft from induced electrical energy and bearing friction may present serious operating problems. One of the more significant contributors to heat build-up in the bearings is excessive lubrication of the bearings. Accordingly, oil flow to the upper spindle bearing in the lubrication systems of the form described has been restricted by providing a very small hole at the lower end of the motor spindle or shaft through which oil enters the axial passage therein.

Unfortunately, this approach to controlling the heat problem is beset by certain difficulties. Among these difficulties is that the small hole at the lower end of the spindle is easily plugged by foreign particles in the oil, and the low oil flow requirements are hard to control. Moreover, although heat built up due to excessive bearing lubrication may be controlled, heat build-up due to electrical energy used in the shaft or spindle is not alleviated by such a system. This problem is compounded in vacuum, where heat removal through air convection is not possible.

It is an object of the present invention to provide an improved lubrication system for a motor having a substantially vertical spindle with a bearing toward the upper end thereof.

Another object of the invention is to provide an improved lubrication system for vertical spindle motors operating in vacuum environments.

It is another object of the invention to provide a lubrication system for vertical spindle electrical motors in which excessive heat build-up is eliminated.

Other objects of the invention will become apparent to those skilled in the art from the following description, taken in connection with the accompanying drawing wherein the sole FIGURE is a full cross sectional view of a turbomolecular pump employing a vertical spindle motor and a lubrication system constructed in accordance with the invention.

Very generally, the lubrication system of the invention is employed in connection with a motor 11 having a substantially vertical spindle with a bearing 13 toward the upper end thereof. The lubrication system comprises means 14 defining a lubricant reservoir 15 at the lower end of the spindle. A passage 16 is provided in the spindle extending along the axis thereof and shaped to conduct lubricant along its length. The passage communicates at the lower end of the spindle with the reservoir and a plurality of outlets 17 extend radially at the upper end of the spindle providing communication from the passage to the outer surface of the spindle above the bearing. Means 18 are spaced radially outwardly of the bearing for receiving lubricant emanating from the outlets. Means 19 define a return path to the reservoir for lubricant received by the receiving means.

Referring now in more detail to the drawing, the lubrication system is illustrated in connection with a motor used to drive a turbomolecular pump. The turbomolecular pump is contained in a pump housing 21 provided with a mounting flange 23 for mounting the pump in communication with a vacuum housing, not shown. The housing 21 is generally cylindrical in shape and is provided with a side outlet opening 25 to which an outlet conduit 27 is clamped by a mounting ring 29. The ring 29 is sealed in a recess 31 in the wall of the housing 21 by an annular seal 33.

A plurality of fixed stator blades 35 are mounted along the interior wall of the housing 21. The stator blades 35 extend inwardly from rings 37 which are clamped between annular clamping spacers 39 in suitable fashion in the housing. A cylindrical spacer 41 spaces the stator blades 35 above the port 25, and a suitable orifice 43 is provided in the cylinder 41 in alignment with the port 25.

The lower end of the housing 21 is closed by a bottom plate 45. The bottom plate 45 is secured to the housing by suitable bolts 47, and is sealed thereagainst by an annular seal 49. A central opening 51 is provided in the lower plate 45 and a lubricant cup 14 is bolted over the opening on the lower surface of the plate 45 by bolts 53. An annular seal 55 seals the periphery of the cup 14 against the plate 45. The cup 14 defines the lubricant reservoir 15.

A flange 57 projects inwardly from the opening 51 and terminates in a collar 59 having a vertical axis. A bearing 61 is supported on the lower side of the flange 57 and is fitted in the opening 51 by an annular vibration damper 63. The lower portion of the spindle or shaft 12 contains a section of reduced diameter 65 to which the inner race of the bearing 61 is fixed, thereby journalling the spindle 12 for vertical rotation within the bearing 61. The upper end of the spindle 12 is provided with a section 67 of reduced diameter which is journalled in the bearing 13. The upper end of the spindle 12 is tapered at 69 and has a mounting collar 71 mounted thereon by means of a clamping ring 73 and a bolt 75. The collar 71 is force fit on the tapered shaft section 69.

A pump rotor assembly 79 is mounted to a radially extending flange 81 which extends outwardly from the collar 71, by means of an inwardly extending radial flange 83. Bolts 85 secure the radial flange 83 to the flange 81 in an overlapped relationship therewith.

The pump rotor assembly 79 is provided with a plurality of rotor blades 87 which extend radially outward therefrom interleaved with the stator blades 37. The design of the blades 35 and 37 is such as to produce molecular flow under free molecular flow conditions in order to pump gases from the upper end of the housing 21 through to the outlet 27. A cup-shaped cap 89 is bolted through a flange 91 by bolts 93 to the flange 83 of the rotor assembly. An annular seal 95 is provided for sealing the cup-shaped cap 89 to the rotor assembly 79.

The upper bearing is supported in a bearing retainer ring 97, resting on an inwardly extending flange 99 thereof and contacting an annular vibration damper 101. A cylindrical support 103 extends upwardly from the bottom plate 45 integral therewith. A cylindrical water jacket 105 fits coaxially within the cylindrical support 103 and an outwardly extending flange 107 rests on the upper edge of the cylindrical support. The flange 107 is positioned between the bearing retainer 97 and the upper end of the cylindrical support 103, and the three elements are held together by bolts 109. An annular seal 111 is provided between the support 103 and the flange 107, and an annular seal 113 is provided between the lower end of the support 107 and a shoulder 115 formed on the interior of the support 103.

An annular recess 117 is formed on the inner wall of the cylindrical support 103, forming an annular chamber between the water jacket 105 and the cylindrical wall or support 103. A coolant inlet passage 119 extends from the recess 117 to a coolant inlet fixture 121. The fixture 121 is sealed to the undersurface of the lower plate 45 by an annular seal 123 and is bolted thereto by bolts 125. A similar arrangement, not shown, is provided for a coolant return passage and suitable fixture.

The motor 11, which drives the pump rotor 79, comprises stator windings 127 and stator windings 129. The stator windings 127 and the stator windings 129 are are supported on the water jacket 105 in suitable relationship to the rotor 79. Electrical energy is supplied to the stator windings through electrical leads 131 which extend through a conduit 133 formed in the lower plate 45. A terminal box 135 is mounted to the lower plate at a flange 137 and is sealed thereto by an annular seal 139.

During operation of the pump, the entire motor and lubrication system, subsequently described, are under vacuum as well as the pump stator and rotor blades. Electrical current is supplied through the leads 131 to the motor 11, causing the spindle 12 to rotate in the bearings 13 and 61. This rotates the rotor 79 and therefore moves the rotor blades 87 with respect to the stator blades 35.

During the course of operation of the pump, both the bearings 13 and 61 are lubricated. In order to convey oil or other lubricant to the bearing 13, a nozzle fixture 141 is provided at the lower end of the spindle 12, forming a part thereof. The nozzle fixture 141 has a tapered lower end 143 which projects downwardly into lubricant contained in the reservoir 15. The nozzle fixture fits within a suitable opening 145 in the lower end of the spindle 12 and is threaded thereto to be driven with the spindle. An axial hole or passage 149 is provided in the nozzle fixture 141 and forms a continuation of the central passage 16 lying on the axis of the spindle 12. The section 149 of the passage 16, however, is tapered to open upwardly along its length. As a result, centrifugal force forces the oil in the reservoir 15 upwardly through the passage 16 to the upper end of the spindle 12.

A plurality of outlets 17 extend radially at the upper end of the spindle and provide communication from the passage 16 to the outer surface of the spindle above the bearing 13. During operation, lubricant emerges from the outlets 17 and is flung radially outward past the bearing 13.

In order to collect the oil moving past the bearing 13, the bearing retainer 97 is provided with an annular recess 18 of frustoconical shape. Lubricant is received in this recess and drains therefrom through a vertical passage 153 in the bearing retainer 97. Lubricant then passes downwardly through a groove 19 in the wall of the water jacket 105 to the space above the lower bearing 61. A drain passage 157 extends from the space above the flange 57 down into the reservoir 15.

The size of the tapered section 149 and the passage 16 are made such as to produce a flow of oil which is substantially greater than that required to lubricate the bearing 13. Were this large amount of oil allowed to lubricate the bearing, this would cause overheating due to overlubrication. The design of the system, however, with the oil receiving recess 18 and the drain passage 19, connected by the drain passage 153 and 157, allow a flow rate of oil much greater than needed for the bearing while lubricating the bearing only so much as is necessary without causing overheating. This high rate of flow cools the spindle 12 by providing rapid circulation of the oil therethrough. Although the passage is tapered in the illustrated form of the invention, any other internal shape such as grooves or blades to produce the desired oil flow would be satisfactory.

In order to divert the small amount of lubricant necessary for the bearing 13 from the main flow, several different expedients are possible. In the illustrated embodiment, a lubrication wire 159 is provided extending downwardly from a retainer plate 161 mounted to the bearing retainer 97 by bolts 163. The wire 159 causes droplets of lubricant to form thereon and drip downwardly onto the bearing 13 for lubricating same. As an alternative, the wire 159 may be dispensed with and the outlets 17 and recess 18 designed such that a spray of lubricant takes place, the part of the spray impinging on the bearing 13 being sufficient to lubricate same. The lower bearing 61 is lubricated by a small lubricant passage 165 which extends downwardly through the flange 57.

The amount of oil flow is selected to be as maximum as possible within practical design limitations. It should be at least several times that necessary to provide adequate lubrication to the bearings, and is preferably much greater than that. Only the amount of lubricant necessary to properly lubricate the bearings is utilized by a suitable bleed-off arrangement from the main flow. On its return, the lubricant is cooled by flowing over the water-cooled non-rotating motor parts, e.g., the water jacket or, alternatively, any other part in thermal proximity thereto. As an alternative to the lubrication of the lower bearing by the means illustrated, it is possible to lubricate the lower bearing in the same manner as the upper bearing is lubricated.

It may therefore be seen that the invention provides an improved lubrication system for a vertical spindle motor. The system has particular application to those types of motors utilized in a vacuum, and provides adequate cooling for the motor spindle while avoiding excessive lubrication of the bearings supporting the spindle. The cooler operating temperature of the spindle allows a lower ultimate pressure to be attained in the evacuated environment than with relatively higher temperature spindles. This is because cooler surfaces generally allow lower pressures.

Various modifications of the invention in addition to those shown and described herein will become apparent to those skilled in the art from the foregoing description and accompanying drawing. Such modifications are intended to fall within the scope of the appended claims.

What is claimed is:

1. In a motor having a substantially vertical spindle with a bearing toward the upper end thereof and incorporating cooling means for the winding of said motor, a lubrication system which is also a cooling system for enabling operation of said motor in a vacuum, comprising, means defining a lubricant reservoir at the lower end of said spindle, a passage in said spindle extending along the axis thereof and having at least a portion of increasing diameter upwardly to cause conduction of lubricant upwardly along its length by centrifugal force, said passage communicating with said reservoir at the lower end of said spindle and said portion of increasing diameter, said portion of said passage in said spindle being of sufficient size and diameter increase to provide a lubricant flow substantially greater than that necessary to lubricate said bearing, said lubricant flow thereby serving as a coolant for said spindle, outlet means extending radially at the upper end of said spindle to provide communication from said passage to the outer surface of said spindle above said bearing, means for receiving lubricant emanating from said outlet means and for directing only the amount of lubricant necessary for proper lubrication to said bearing, and means defining a return path to said reservoir for lubricant received by said receiving means, said return path defining means having at least a portion located in thermal proximity to said cooling means for said motor winding.

2. Apparatus according to claim 1 wherein said receiving means comprise means projecting into the flow of lubricant emanating from said outlet means for intercepting a portion of the lubricant passing from said outlet means and allowing it to drop on said bearing.

* * * * *